March 13, 1962   W. E. GROVER ET AL   3,024,931
CABLE OPERATED DUMP BODY
Filed Oct. 15, 1959   5 Sheets-Sheet 2
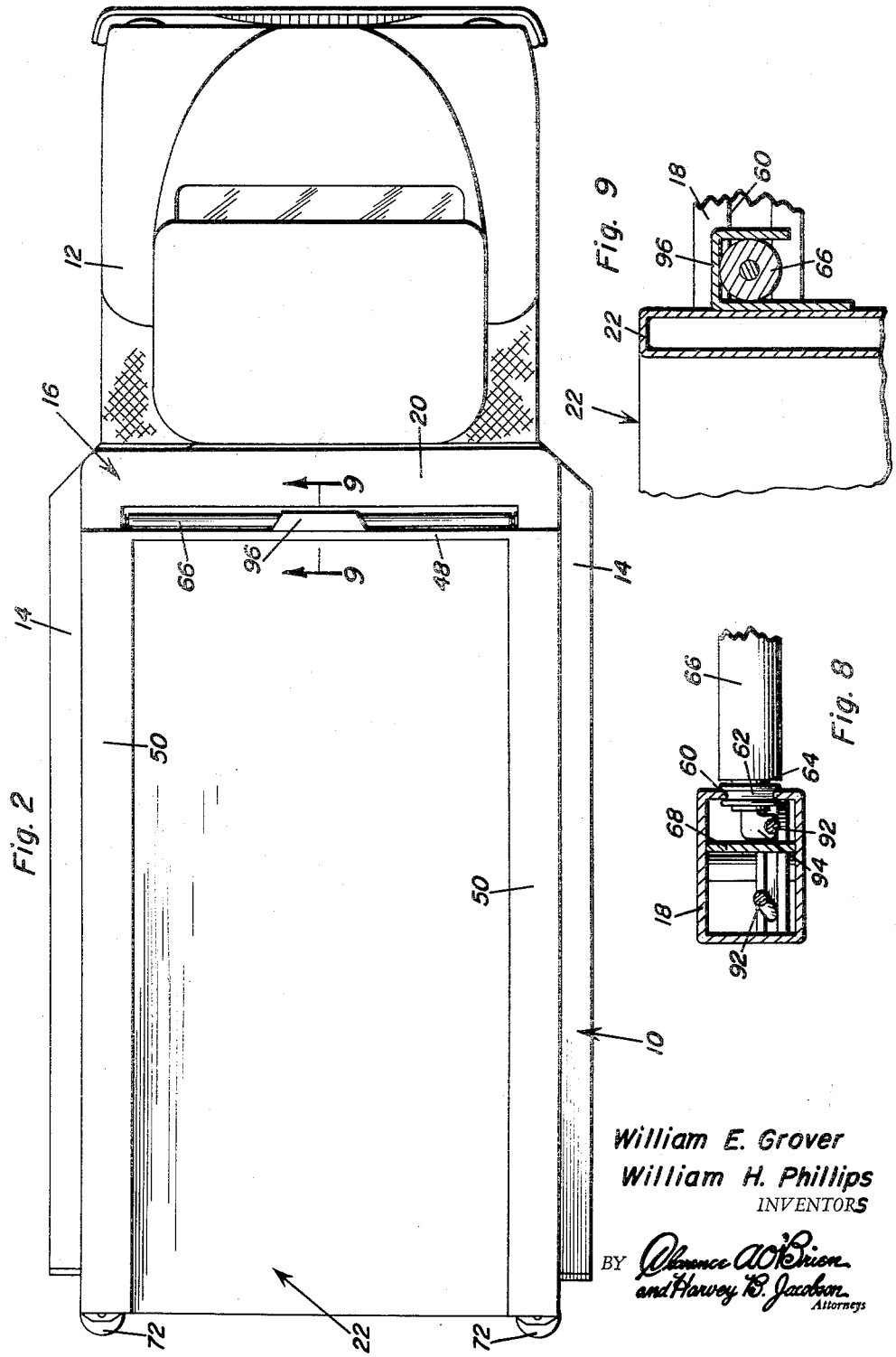
William E. Grover
William H. Phillips
INVENTORS March 13, 1962 W. E. GROVER ET AL 3,024,931
CABLE OPERATED DUMP BODY
Filed Oct. 15, 1959 5 Sheets-Sheet 3
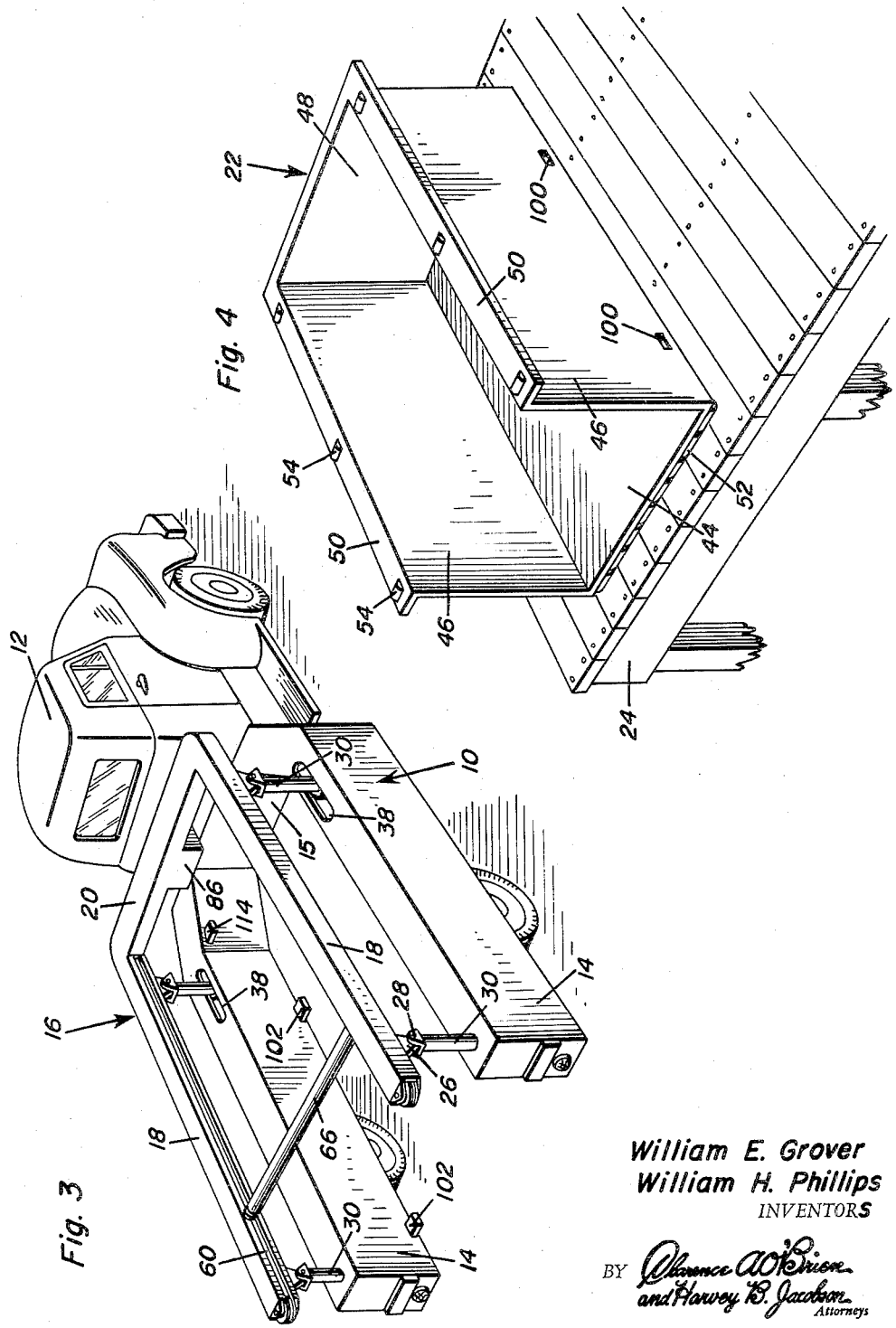
William E. Grover
William H. Phillips
INVENTORS
BY Clarence A. O'Brien
and Harvey B. Jacobson
Attorneys

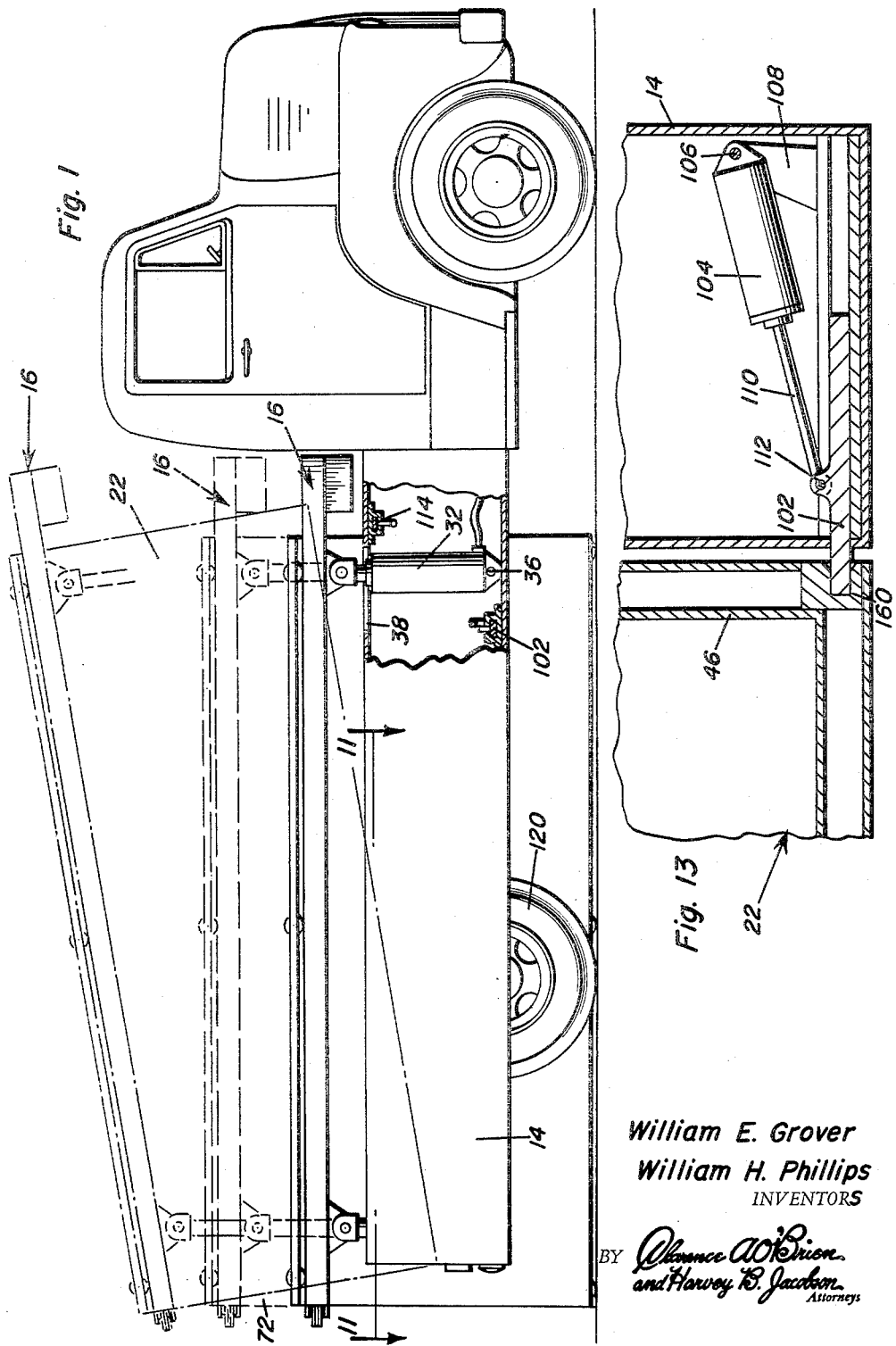

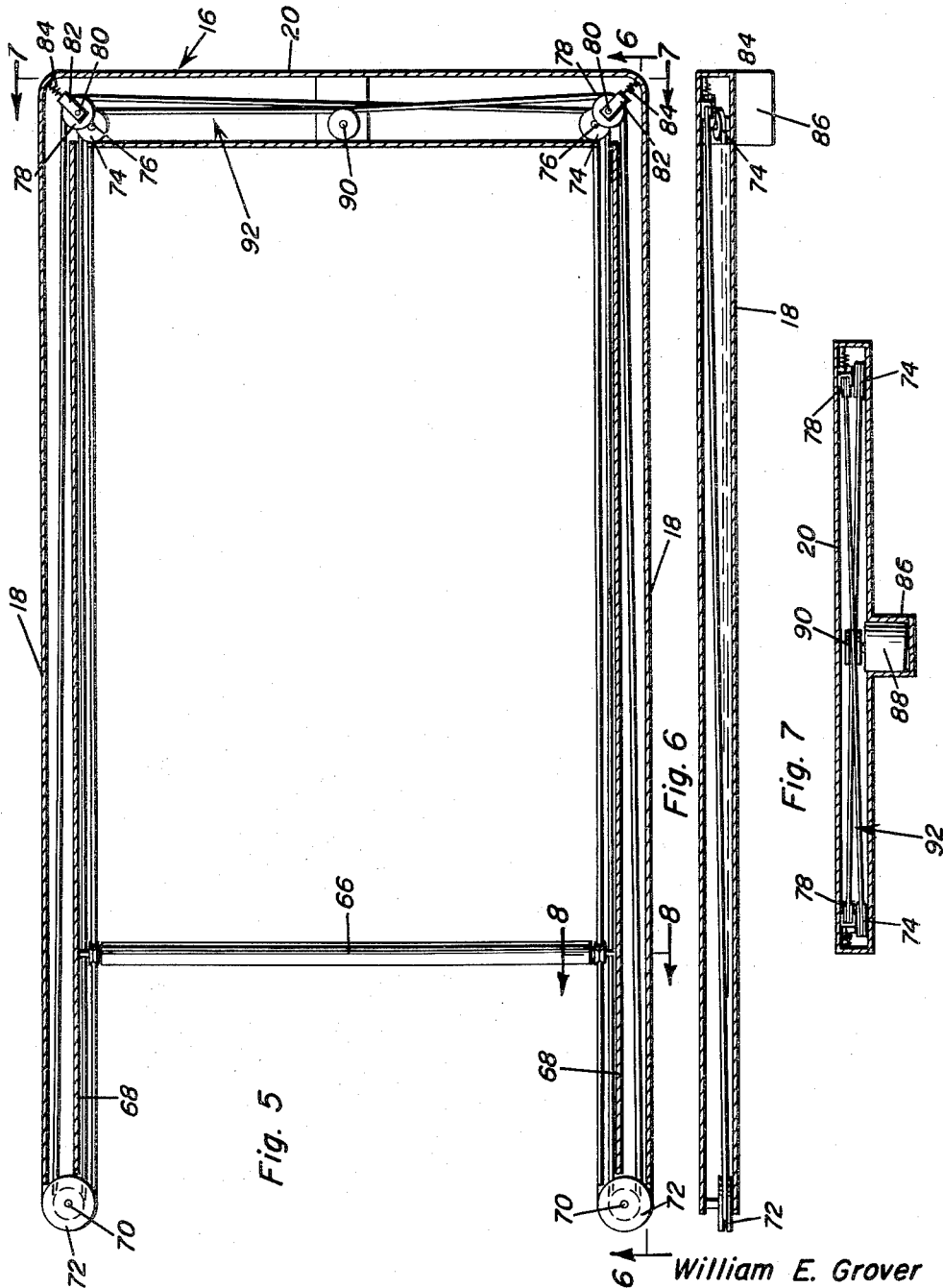

March 13, 1962 W. E. GROVER ET AL 3,024,931
CABLE OPERATED DUMP BODY
Filed Oct. 15, 1959 5 Sheets-Sheet 5
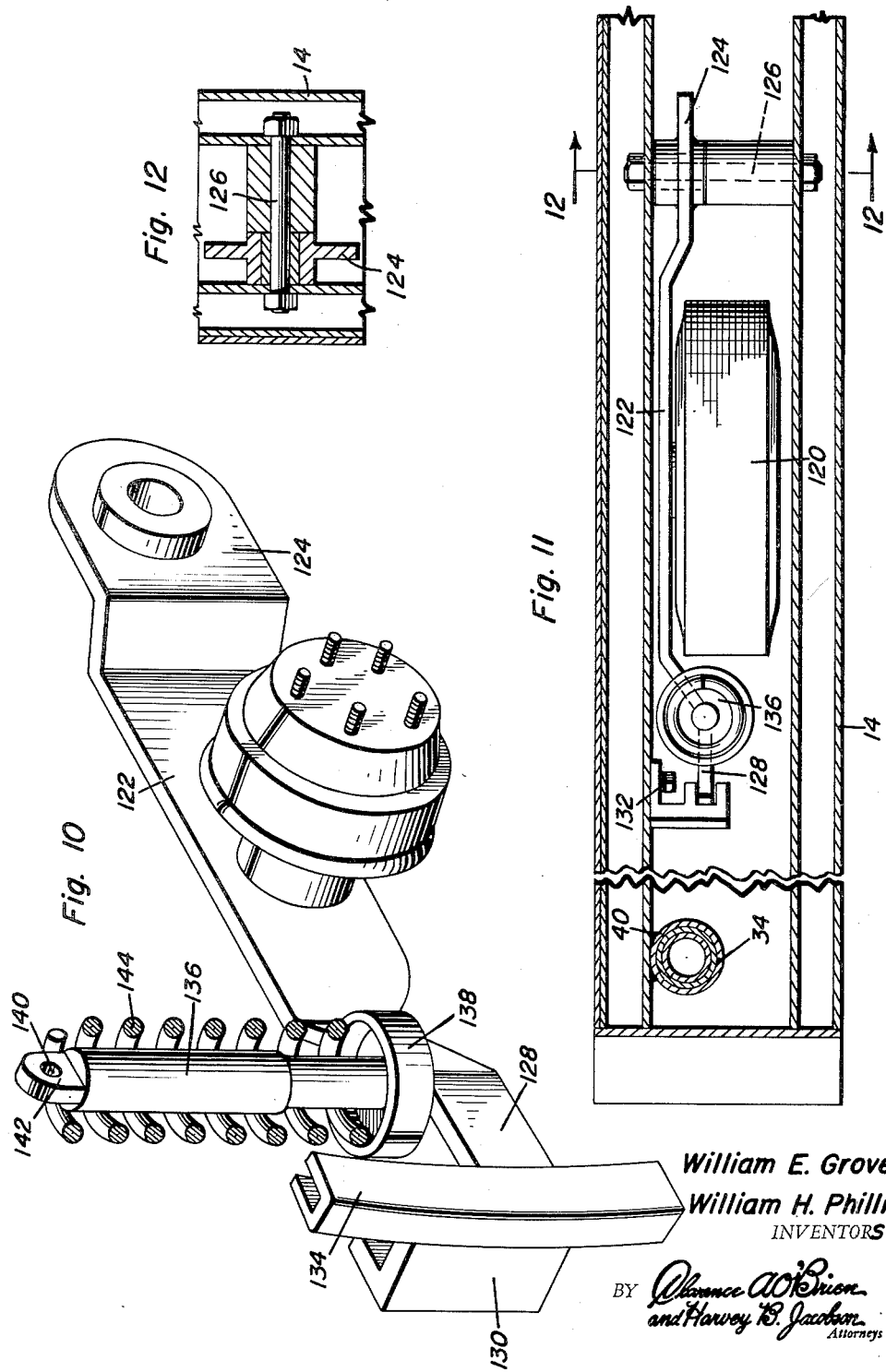
William E. Grover
William H. Phillips
INVENTORS

United States Patent Office 3,024,931
Patented Mar. 13, 1962

3,024,931
CABLE OPERATED DUMP BODY
William E. Grover, 3408 Adams, and William H. Phillips, 2117 36th, both of Two Rivers, Wis.
Filed Oct. 15, 1959, Ser. No. 846,680
9 Claims. (Cl. 214—517)

The invention comprises a novel and useful cable operated dump body and more particularly relates to a motor vehicle having a demountable body together with novel and improved means for advantageously, and by the power of the vehicle, loading and unloading the body from the vehicle selectively at either ground level or at the level of a dock or platform.

The principal object of this invention is to provide a truck having a construction affording improved means for receiving, supporting and raising or lowering a demountable truck body thereon.

A further object of the invention is to provide a motor vehicle in accordance with the foregoing object wherein the means are capable of raising the demountable body from or dumping the demountable body upon the ground level or the level of a dock or platform by the power of the vehicle with equal facility.

Another object of the invention is to provide a device in accordance with the preceding objects which shall include means operated by the power of the vehicle for mounting or demounting the body without changing the height of the body with respect to its relative supported position in the vehicle during the mounting and demounting operation of the body.

A further important object of the invention is to provide an apparatus in accordance with the immediately preceding object which will enable the body to be loaded from or discharged to any selected height between that of the ground or of a loading dock or platform.

Yet another object of the invention is to provide an apparatus in accordance with the foregoing objects which shall be so constructed that it shall impose no limitations or restrictions as to the vertical height of the body which shall be demountably carried by the device since the support of the body shall be effected by engagement of the device solely with the sides of the body.

A still further important object of the invention is to provide a truck in accordance with the preceding objects which shall include improved locking means for securing the body in the chassis arms of the truck against accidental movement.

A further and more specific object of the invention is to provide a truck having a U-shaped support means open at its rear end together with a demountable body which may be slidably received in or discharged from the open rear end of the support means together with improved mechanism whereby the power of the vehicle shall be employed to load the body in the U-shaped support means or discharge it therefrom.

A still further specific object of the invention in accordance with the immediately preceding object is to provide a mechanism which shall include a transversely extending traveling bar mounted upon the support means and slidable longitudinally thereof and to serve the joint functions of effecting sliding movement of the body into and from the support means as well as stiffening the latter at the open rear ends of the same.

Yet another specific object of the invention in accordance with the immediately preceding objects is to provide a device wherein a cable mechanism is provided for operating the traveling bar and thus apply power to the body for moving the same into its mounted position or discharging the body from the truck, and wherein pulleys of the cable are also employed as guide rollers to assist the entry and egress of the body with respect to the open rear end of the support means.

And a final important object of the invention to be specifically enumerated herein resides in the provision of a truck in accordance with the preceding objects wherein a U-shaped rearwardly opening support means in which is detachably mounted and supported a cargo body shall be capable of independent adjustment at each of the corners thereof in order to in turn adjust the position of the body for loading or unloading operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view with parts broken away and shown in vertical section and with alternative position of the demountable body support frame being shown in dotted lines therein and illustrates the preferred embodiment of a truck incorporating therein the principles of this invention;

FIGURE 2 is a top plan view of the arrangement of FIGURE 1 with the demountable body being shown in the support frame and in the normal position of the parts for travel of the truck upon a highway;

FIGURE 3 is a perspective view of the embodiment of FIGURE 1 but with the demountable body being removed from its support frame and with a traveling bar forming a part of the power operating means for loading and unloading the body being shown in the intermediate position of its operation;

FIGURE 4 is a perspective view showing the demountable body as removed from the truck and resting upon a dock or platform in readiness for being again mounted upon the support means of the truck;

FIGURE 5 is a view in horizontal section through the U-shaped support frame of the truck and showing the disposition of the traveling bar therein and of the operating means consisting of cables, pulleys and a winch mechanism mounted thereon;

FIGURE 6 is a detail view in vertical longitudinal section taken substantially upon the plane indicated by the section line 6—6 of FIGURE 5 and showing the disposition of one flight of the cable means within one arm of the U-shaped support frame of the device;

FIGURE 7 is a further detail view in vertical transverse section taken substantially upon the plane indicated by the section line 7—7 of FIGURE 5 and showing in particular the mounting of the winch in the central or bight portion or member of the U-shaped support frame and the connection of the winch to the cable system;

FIGURE 8 is a detail view taken in vertical transverse section and upon an enlarged scale substantially upon the plane indicated by the section line 8—8 of FIGURE 5 and showing in particular the mounting of one end of the traveling bar in one arm of the U-shaped support frame and the attachment of the traveling bar to the cable system therein;

FIGURE 9 is a further detail view taken upon an enlarged scale in vertical longitudinal section substantially upon the plane indicated by the section line 9—9 of FIGURE 2 and showing in particular the manner in which the traveling bar is adapted to be coupled to the demountable body for imparting movement thereto;

FIGURE 10 is an enlarged detail in perspective, parts being broken away and shown in section, of a resilient wheel mounting arrangement of the vehicle;

FIGURE 11 is a horizontal longitudinal sectional view taken substantially upon the plane indicated by the section line 11—11 of FIGURE 1 with parts broken away showing the wheel mounting construction and the location of an elevating jack for adjusting the position of the U-shaped support frame with respect to the body;

FIGURE 12 is a detail view in vertical transverse section taken substantially upon the plane indicated by the section line 12—12 of FIGURE 11; and FIGURE 13 is a further detail view in vertical transverse section upon an enlarged scale showing the power operated locking means by which the body is locked to the U-shaped frame of the truck against accidental displacement therefrom.

In the embodiment of a suitable form of truck in which is incorporated the principles of this invention, as illustrated in the drawings, it will be observed that there is provided a truck indicated generally by the numeral 10 and which has a cab portion 12 with the usual engine or power plant, but that the chassis and after portion of the truck is of a novel construction. Thus, the frame or chassis of the truck is U-shaped, opening at the rear thereof, consisting of a pair of parallel rearwardly extending arms 14 which are connected at their forward ends adjacent the cab as by a central or bight portion 15. The arms at least are preferably hollow for a purpose to be subsequently set forth and as above-mentioned are in the form of a rearwardly opening U for a purpose to be subsequently apparent.

Movably supported and mounted upon the U-shaped portion of the truck is a U-shaped carrier frame designated generally by the numeral 16. This frame likewise includes a pair of parallel arms 18 which are connected at their front ends by the central or bight portion 20 thus forming a U-shaped frame open at its rear end and which as shown in FIGURE 3 is disposed above and in parallel relation to the U-shaped portion of the truck chassis or body. A removable cargo box or body indicated generally by the numeral 22, see FIGURE 4, is adapted to be removably received in the U-shaped structure of the truck chassis and the support frame 16, being carried by the latter and being movable by power means through the open rear end of the truck chassis and the support frame.

Indicated in FIGURE 4 by the numeral 24 is an elevated support upon which the body may rest as for example a dock or platform raised above the ground and which is adapted to support and receive a body either loaded or unloaded when the same has been demounted from the truck 10 or is adapted to be mounted thereon as set forth hereinafter.

The support frame 16 is mounted upon the arms 14 of the U-shaped portion of the truck chassis in such a manner that it may be readily raised or lowered relative to the chassis by power means; and each corner of the U-shaped frame may be individually vertically adjusted in order to enable the U-shaped support frame 16 to be disposed at any desired inclination with respect to the truck 10.

For this purpose of adjustment, it will be observed that the underside of the arms 18 of the frame 16 have depending support brackets or lugs 26 which are pivotally connected as by pivot pins 28 to the upper ends of the piston rods 30 of longitudinally spaced front and rear hydraulic cylinder units 32 and 34 respectively, the forward cylinders 32 being shown in FIGURE 1 while the rear cylinders 34 are shown in FIGURE 11.

As will be observed from FIGURE 1 the forward cylinders 32 in turn have their lower ends pivotally connected as by pivot pins 36 to a suitable portion of the structure in the hollow arms 14 to thereby permit relative tilting of the forward cylinders 32, there being provided an opening 38 in the top surface of these arms to permit such swinging movement of the cylinder units as the latter extend therethrough. The rear cylinder units 34, however, as suggested in FIGURE 11 are secured as by welding 40 or in any other suitable manner rigidly to the inside wall of the hollow arms 14. Thus the rearward cylinders 34 comprise vertically adjustable but relatively rigid supports thus enabling a tilting or vertical swinging movement of the U-shaped support frame 16 about these rear cylinder units under the operation of the forward cylinder units 32.

It will be understood at this point that each of the four cylinders 32 or 34 will be connected to any suitable source of hydraulic fluid under pressure, as for example a hydraulic pump operated by the power plant of the truck, so that by means of conduits and control means, not shown, any individual cylinder may be independently operated. It is thus possible to lift any corner of the support frame 16 either singly or in conjunction with simultaneous operation and lifting of any other corner, thereof. Further, the entire support frame may be lifted to a desired elevation by operation of the rear cylinders 34 whereupon operation of the front cylinders 32 will effect a tilting of the frame about its rear pivotal supports. By this means the plane of the top surface of the U-shaped frame 16 may be disposed at any desired inclination with respect to a horizontal plane for a purpose to be subsequently apparent.

At this point it will be understood that the opening between the arms 14 of the truck chassis is equal to the width of the opening between the arms 18 of the support frame. A demountable cargo box or truck body of any desired construction is adapted to be removably received in the U-shaped constructions, one satisfactory form of such body being shown at 22 in FIGURE 4. The box shown has a bottom 44 therein with a pair of vertical parallel side walls 46 together with a vertical front wall 48. The rear of the body may be open if desired as shown or may have a rear closure wall, not shown. Further, the box may have a cover or may be open as shown. In any event, projecting laterally outwardly from the walls of the body are support flanges 50 for the side walls. As shown these support flanges are mounted at the upper edge of the side walls but it will be readily understood that they may be disposed at any desired region upon the side walls. The dimensions are such that the side walls 46 of the body 22 are readily slidable into and out of the rear open ends of the U-shaped chassis of the truck and the U-shaped support frame, with the supporting flanges 50 being adapted to overlie and rest upon the top surface of the arms 18 of the support frame in the manner shown in FIGURES 1 and 2. In order to facilitate sliding movement of the body into and out of the support frame and the truck body, there is preferably provided a plurality of anti-friction rollers 52 on the bottom of the box and rollers 54 which are journaled in and extend through suitable apertures in the support flanges 50 and project therebeneath so that these rollers will bear upon the top surfaces of the arms 18 to facilitate movement of the cargo body therealong.

Power operating means which derives its power from the power plant of the truck 10 is provided to effect a positive movement of the demountable body 22 into and from the support frame. For an understanding of this power operating means attention is now directed primarily to FIGURES 5-8. As will now be understood the two arms 18 and the bight portion 20 of the support frame are each generally rectangular in cross section and are hollow housings or casings. As will be best perceived from a consideration of FIGURES 3 and 8, the inner side walls of the arms 18 are provided with longitudinal slots 60 which constitute guides and trackways for slidably receiving guide and support rollers 62 mounted upon the axially projecting pintles 64 of a traveling bar 66. The latter is thus supported by the two arms 18 and extends across the width of the same and is mounted in the slots 60 for longitudinal movement along the support frame. This traveling bar is connected to a power operating means in a manner to be subsequently set forth and is utilized to effect positive sliding movement of the demountable body 22 into and out of the supporting frame by way of the open rear end thereof. Referring again particularly to FIGURE 8 it will be observed that the hollow arms 18 have vertically extending longitudinally disposed partitions in the form of plates 68 which thus divide each arm into two longitudinally extending laterally separated chambers. As shown in FIGURE 5, the extremities of these divider plates or partitions 68 terminate inwardly of the extremities of the arms for a purpose which will be subsequently apparent. Journaled at the rearward ends of the arms 18 by means of vertical axles 70 is a pair of guide pulleys 72. These pulleys have relatively deep grooves therein and as shown in FIGURES 1–3 project or extend rearwardly outwardly of the interior of the hollow arms and slightly inwardly between the arms so that they may constitute guide rollers which engage the sides of the demountable body 22 to assist in the sliding movement of the same into and out of the rear ends of the support frame and of the truck chassis.

At the junction of the forward ends of the hollow arms 18 with the bight portion 20 of the support frame there are provided further sets of pulleys. Thus, there is provided a set of lower pulleys 74, each journaled upon a fixed axle 76, together with a set of upper pulleys 78, each journaled upon a pivot 80 which is carried by a block 82 and which is resiliently mounted as by springs 84.

At its mid-portion, the bight portion 20 has a depending housing or casing 86 in which is received a motor 88 having a winch drum 90 thereon. This motor is either electrical or hydraulically operated as desired and is reversible in order to cause the drum 90 to be capable of being revolved in either direction. An endless cable designated generally by the numeral 92 is connected with the winch drum 90, with the pulleys 74 and 78, and with the pulleys 72 and is then likewise secured to the traveling bar 66. It will be observed that the endless cable has an upper flight which is entrained over the spring mounted upper pulleys 78, extends through the outer compartment in the hollow arms 18, passes about the rearward pulleys 72, then extends back through the inner compartment of the hollow arms, is connected to the extremities of the traveling bar 66, then passes over the lower fixed pulleys 74 and is engaged over the lower portion of the drum 90. In this cable system it will be observed that the spring mountings 84 of the upper set of pulleys 78 operate as slack take-up means to insure tautness of the cable about its series of pulleys; and which will provide a certain amount of resilient resistance which will accommodate itself to thermal expansion of the cable system.

Referring next to FIGURE 8 it will be observed that that flight of the cable 92 which lies in the inward longitudinal compartment of each arm is fixedly secured as by suitable clamps 94 to the extremities of the pintles 64 of the traveling bar 66.

It will thus be apparent that when the motor 88 is operated, the winch drum 90 will impart movement to the cable in one direction or the other about the system of pulleys, thus positively moving the traveling bar 66 either forwardly or rearwardly of the guide slots 60 in the arms.

Referring now especially to FIGURE 9 in conjunction with FIGURE 2, it will be noted that the forward end wall 48 of the truck demountable body 22 is provided at its mid-portion with a U-shaped bracket or clamp 96 which is downwardly opening and which is adapted to embrace and rest upon the traveling bar 66. When the traveling bar is disposed in this hook or clamp 96 it will be observed that movement of the traveling bar as effected by the winch drum 90 will cause positive forward or rearward sliding movement of the demountable body with respect to the arms of the support frame.

Referring now especially to FIGURES 1, 3, 4 and 13 it will be observed that lock means are provided to prevent any accidental movement of the demountable body with respect to the support frame and the U-shaped rear portion of the truck chassis. Thus, each side wall 46 of the demountable body is provided with slots or recesses 100 therein and horizontally slidable locks 102 are mounted in the bottom portion of the hollow arms 14 of the chassis frame and are movable laterally into and out of the sockets 100. A fluid pressure actuating means consisting of a cylinder and piston unit 104 as disposed in the hollow arms 14, is adapted to be mounted as by a pivot 106 upon a bracket 108, and has the piston rod 110 thereof pivoted at 112 to the locking pin or plate 102. Upon operation of the hydraulic units 104, the lock members 102 may be slid into or out of engagement with the locking recesses 100 of the body to thereby selectively lock the same into position or release the same as desired.

Similar locking means 114 are mounted in the forward end and top portion of the arms 14 which slide inwardly and forwardly of the forwardmost position of the box and are withdrawn only when dumping, to allow the front lower end of the box to swing forward and upward. Their primary function is to absorb the shock of the body at full entry.

Referring now to FIGURES 10–12 it will be observed that there is provided a novel construction for mounting the rear wheels of the truck frame. Thus, each rear wheel 120 is journaled at the intermediate portion 122 of a lever whose one end 124 is mounted upon a fulcrum 126 extending across and supported by the inner and outer walls of the arm 14 of the U-shaped chassis. At its other end 128, there is provided a guide bracket 130 secured to the inner side wall of the arm 14 as by bolts 132, and which is provided with an arcuately shaped channel guide track 134 in which the extremity 128 is slidably received. Thus the lever which supports the wheel 120 is pivotally mounted and is guided for vertical swinging movement about the horizontal axis afforded by its fulcrum pin 126.

In order to impart a resilient, cushioned support to this lever and thus produce a shock absorbing action for the rear portion of the chassis upon the rear supporting wheels 120, there is provided a hydraulic unit 136 which is secured at its lower end as at 138 to the lever and which at its upper end is provided with an aperture 140 in the ear 142 by which the unit is secured pivotally in any suitable manner within the hollow side arms 14. A compression spring as at 144 encircles the unit 136 to yieldingly urge the lever downwardly and thus maintain the U-shaped rear portion of the truck chassis in its elevated position.

The operation of the apparatus in accordance with this invention is as follows:

When a truck body is to be mounted upon the truck, either loaded or empty, and either from the ground or from the platform 24, the truck is backed so that its open rear ends of the U-shaped chassis and the U-shaped supporting frame are alined with the body. The support frame is then vertically adjusted by the hydraulic actuating units 32 and 34 to the desired elevation and desired inclination or tilted position as may be necessary with respect to the body of the truck, so that the upper surfaces of the support frame are caused to be disposed slightly below the support flanges 50 of the demountable body. Thereupon the truck is moved rearwardly, with the pulleys 72 acting as guides to facilitate passage of the stationary demountable body 22 into the open rear extremities of the support frame. As soon as the truck has moved rearwardly to a position where the hook or clamp 96 will overlie the traveling bar 66 after the latter has been moved into its rearward position, the support frame is then raised to cause the traveling bar to engage in this hook or clamp in the manner illustrated in FIGURE 9.

The motor 88 is now placed in operation and the winch drum 90 through its cable system will then move the traveling bar 66 forwardly thus drawing the demountable body into proper position upon the support arms 18, the rollers 54 and the rollers 52 on the bottom of the box assisting in such movement. With the body properly in place, the locking members 102 may be actuated to securely lock the body against any unintentional movement.

When it is desired to unload the body a reverse procedure is employed. The locking members 102 are disengaged and any necessary manipulation or adjustment as to height, tilting and the like of the support frame 16 is likewise effected. Thereupon, with the body 44 being disposed so that it either rests directly upon the ground or upon the platform or dock 24 or other supporting surface, the winch drum is actuated and the traveling bar 66 moves rearwardly of the arms 18 of the support frame, until the demountable body has been completely ejected from the latter. Alternatively, the truck is moved forward allowing the stationary body to thus slide through the open rear ends of the support frame and the truck chassis. In some instances both of these methods may be employed to effect removal of the truck body. In any event, when the truck body reaches the rearward end of the support frame, the rear end of the frame may be lowered to cause the traveling bar 66 to disengage from the hook 96 if such operation has not already been effected, and the body is thus completely detached from the truck.

It will be observed that this invention thus provides a power operating mechanism, deriving its power from the power plant of the truck, and which constitutes a means capable of loading a body upon the truck from either the ground or from a dock or platform; and for unloading a body from the truck either to the ground or a dock or platform. Further, this action may be effective regardless of the sloping or tilting of the ground with respect to the place where the body is to be deposited or removed from, since individual adjustment of the hydraulic units 32 and 34 will tilt the support frame to the desired relationship with respect to the body.

It will be appreciated that although the power operated cable and pulley assembly is preferred as a simple effective and dependable means for imparting positive motion to the traveling bar 66, other desired means can be utilized for effecting such motion such as gearing, hydraulic or mechanical means; or even power driven gearing carried by the arms 18 could engage racks on the sides of the demountable body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A demountable body truck including a chassis and a support frame, means independently and vertically adjustably supporting said support frame at each corner upon said chassis, said chassis and frame having vertically alined, rearwardly opening U-shaped portions, a demountable body removably mounted in both said U-shaped portions, means for supporting said body upon said frame and means slidably mounted upon said U-shaped portion of said support frame for sliding said body into and out of said portions.

2. The combination of claim 1, including means for engaging and locking said body to one of said portions.

3. The combination of claim 2, including fluid pressure actuating means carried by one of said portions for operating said locking means.

4. The combination of claim 1, wherein said means for sliding said body comprises a traveling bar slidably and guidably mounted upon said support frame for movement longitudinally thereof, means for connecting said body to said traveling bar, means connected to each end of said traveling bar for causing movement of said traveling bar longitudinally of said support frame.

5. The combination of claim 4 wherein said means for causing movement includes a power source and a cable system connected to said power source and to said traveling bar and operable to effect positive movement of the latter in either direction.

6. A truck construction comprising a chassis and a support frame thereon with each having its rear end U-shaped with parallel arms defining a rearwardly opening space therebetween, the arms of said chassis and frame being vertically alined, a demountable cargo body received in the space between the parallel arms of the body and frame and being supported by the latter and being slidable into and out of said spaces through said rearward openings thereof, operating means for sliding said body into and out of said spaces, said operating means being mounted entirely upon and housed within said support frame, elevating means connected to said chassis and support frame for independently raising and lowering each of the front and back ends of each side of said support frame relative to said chassis.

7. A truck construction comprising a chassis and a support frame thereon with each having its rear end U-shaped with parallel arms defining a rearwardly opening space therebetween, the arms of said chassis and frame being vertically alined, a demountable cargo body received in the space between the parallel arms of the body and frame and being supported by the latter and being slidable into and out of said spaces through said rearward openings thereof, operating means for sliding said body into and out of said spaces, said operating means being mounted entirely upon and housed within said support frame, locking means carried by the arms of said chassis and engageable with said body for locking the same against movement in said chassis, actuators for said locking means mounted in the arms of said chassis.

8. A truck construction comprising a chassis and a support frame thereon with each having its rear end U-shaped with parallel arms defining a rearwardly opening space therebetween, the arms of said chassis and frame being vertically alined, a demountable cargo body received in the space between the parallel arms of the body and frame and being supported by the latter and being slidable into and out of said spaces through said rearward openings thereof, operating means for sliding said body into and out of said spaces, said operating means being mounted entirely upon and housed within said support frame, said arms of said frame having longitudinal guides, a traveling bar extending between the frame arms and having its ends slidably disposed in said guides, operating means mounted in said support frame and connected to said traveling bar for causing sliding movement of said bar upon said guides, means for securing said bar to said body.

9. The combination of claim 8, wherein said frame has hollow arms and a hollow bight portion connecting the forward ends of said arms, said last mentioned operating means including a motor mounted in said bight portion, connecting means disposed in said hollow arms and bight portion and secured to the ends of said bar and to said motor for actuating the former by the latter.

References Cited in the file of this patent
UNITED STATES PATENTS

| | | |
|---|---|---|
| 1,802,010 | Fitch | Apr. 21, 1931 |
| 1,866,640 | Fontaine | July 12, 1932 |
| 2,379,094 | Maxon | June 26, 1945 |
| 2,672,247 | Jewett | Mar. 16, 1954 |
| 2,748,965 | Grey | June 5, 1956 |
| 2,846,092 | Garnett | Aug. 5, 1958 |